United States Patent [19]
Reichen et al.

[11] Patent Number: 5,343,680
[45] Date of Patent: Sep. 6, 1994

[54] SUSPENSION MECHANISM FOR REEL MOWERS

[75] Inventors: Ronald L. Reichen, Horicon, Wis.;
David H. Diebold, Ottumwa, Iowa;
Larry N. Smith, Beaver Dam, Wis.;
Stephen E. O'Brien, Ottumwa, Iowa;
David L. Phillips, Mayville, Wis.

[73] Assignee: Deere & Company, Moline, Ill.

[21] Appl. No.: 940,418

[22] Filed: Sep. 3, 1992

[51] Int. Cl.$^5$ .......................................... A01D 34/62
[52] U.S. Cl. .......................................... 56/249; 56/7; 56/294
[58] Field of Search .................... 56/249, 7, 15.1, 15.2, 56/253, 294, DIG. 9, DIG. 11, DIG. 14

[56] References Cited

U.S. PATENT DOCUMENTS

| | | | |
|---|---|---|---|
| 3,410,063 | 11/1968 | Speiser | 56/7 |
| 3,514,926 | 6/1970 | Heth et al. | 56/7 |
| 3,613,337 | 10/1971 | Akgulian et al. | 56/7 |
| 3,616,626 | 11/1971 | Bramley et al. | 56/26 |
| 3,824,772 | 7/1974 | Sorenson et al. | 56/249 X |
| 4,072,001 | 2/1978 | Aldred | 56/7 |
| 4,384,443 | 5/1983 | Hoogstrate | 56/11.9 |
| 4,711,072 | 12/1987 | Aldred | 56/6 |
| 4,769,976 | 9/1988 | Bassett et al. | 56/7 |
| 5,042,236 | 8/1991 | Lamusga et al. | 56/7 |
| 5,170,613 | 12/1992 | Heise et al. | 56/249 |

OTHER PUBLICATIONS

Brochure entitled: "Toro Reelmast 223-D" published by The Toro Company in 1990, pp. 1-8.
Brochure entitled "3325 Professional Turf Mower", published by Deere & Co. in 1990, pp. 1-4.
Brochure entitled "Toro Reelmaster 216", published by The Toro Company in 1990, pp. 1-4.
Brochure entitled "Toro Reelmaster 335-D", published by the Toro Company in 1990, pp. 1-4.
Brochure entitled "Jacobsen LF-100 Lightweight Mowering Quality With High Productivity", published by the Jacobsen Division of Textron in 1989, pp. 1-4.
Brochure entitled "Ransomes 220 M28-4WD" published by Ransomes Inc. in 1992, pp. 1 and 2.
Brochure entitled "Ransomes Fairway 5000 Mower" published by Ransomes Inc. in 1989, pp. 1-6.
Brochure entitled "Ransomes 300 M35-4WD" published by Ransomes Inc., in 1992, pp. 1 and 2.

*Primary Examiner*—Terry L. Melius

[57] ABSTRACT

A mechanism for shifting reel mower cutting units to a position whereat the undersides of the cutting units are exposed for service. A knuckle joint is provided for pivoting the cutting units as the lift arms are raised to thereby shift the cutting units to service positions. A connection point is provided between a yoke and the cutting unit which is located at the upper rear quadrant of the cutting unit's side frame for generally balancing the force distributed to the ground through the front and rear rollers during forward mowing operations.

35 Claims, 9 Drawing Sheets

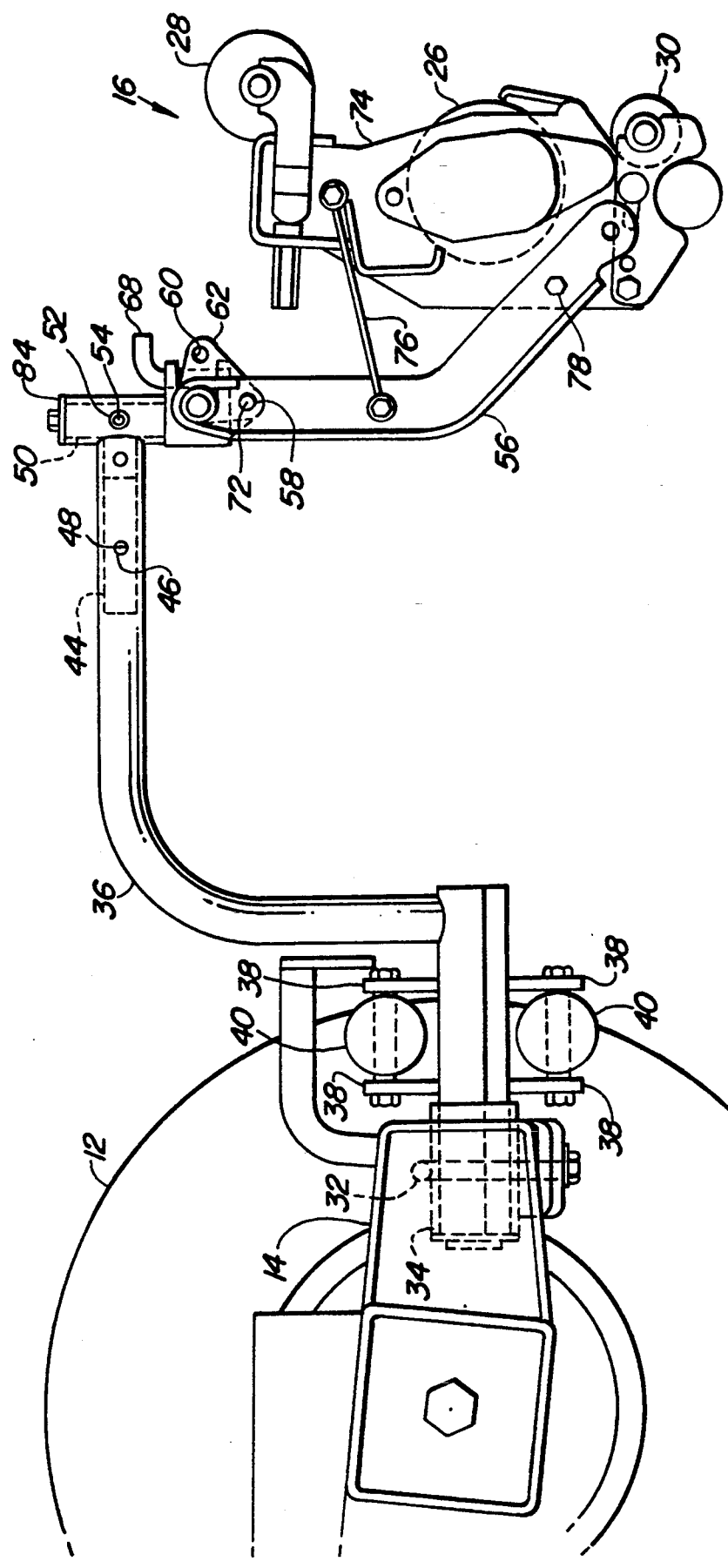

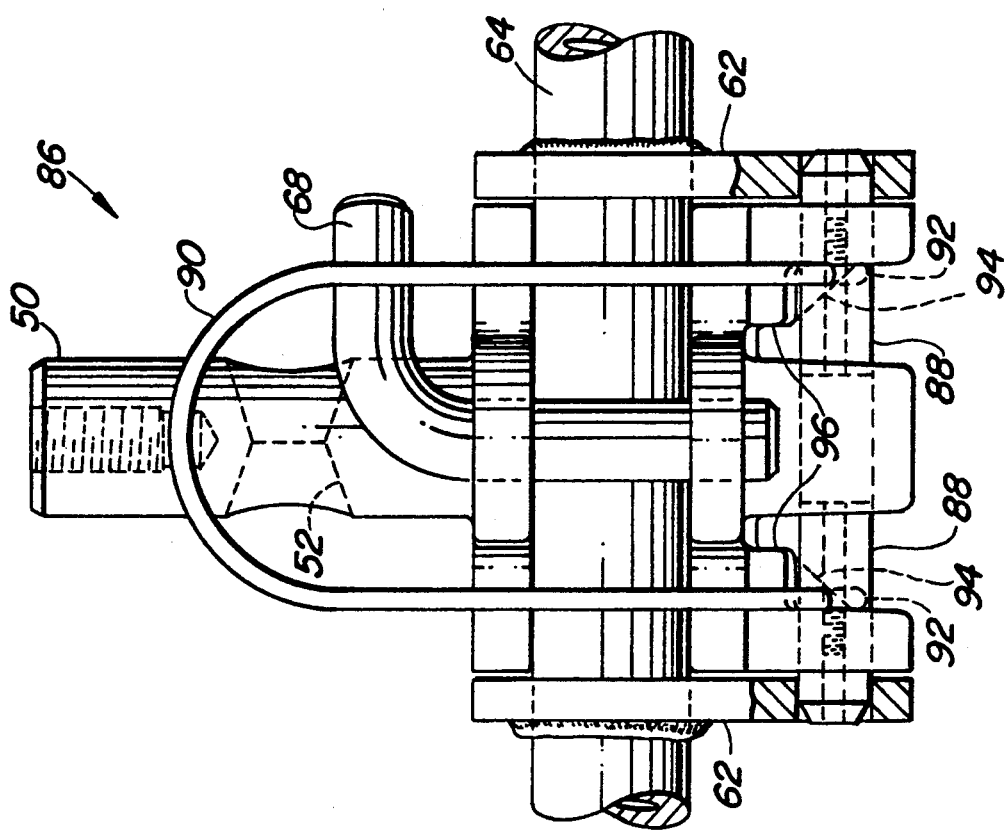
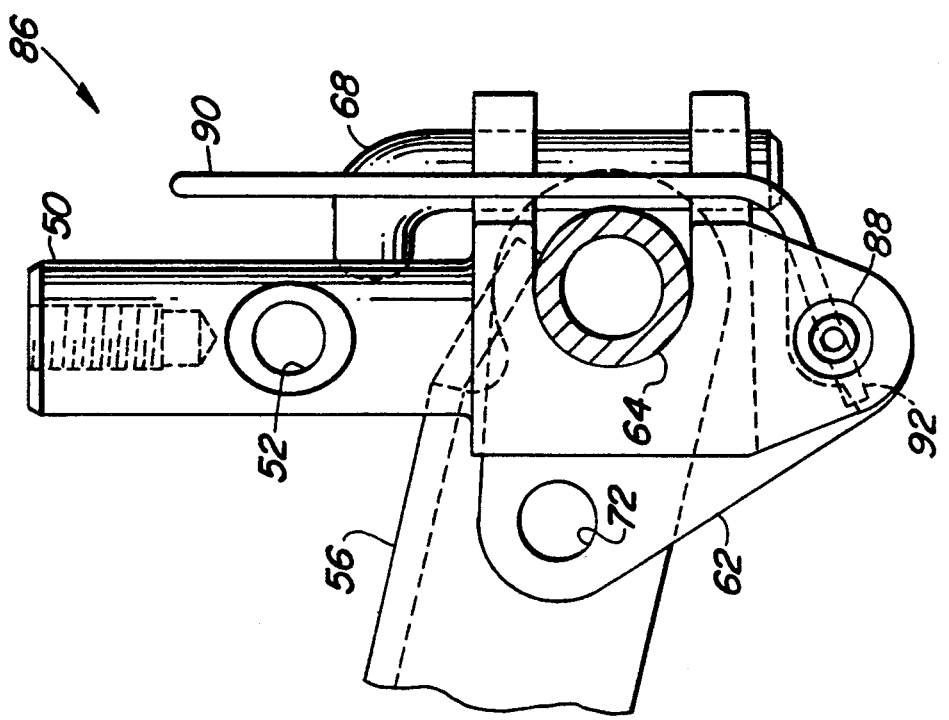

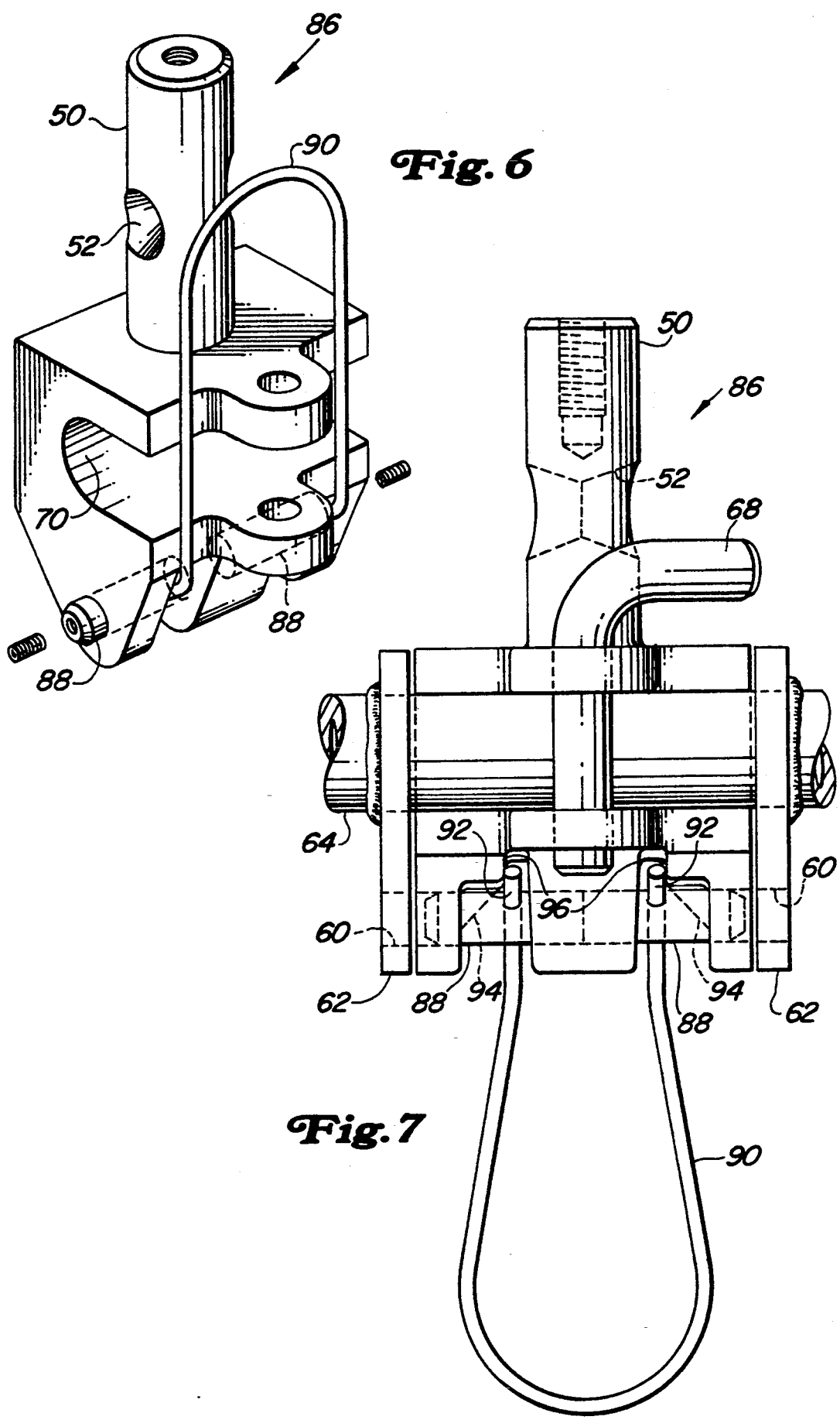

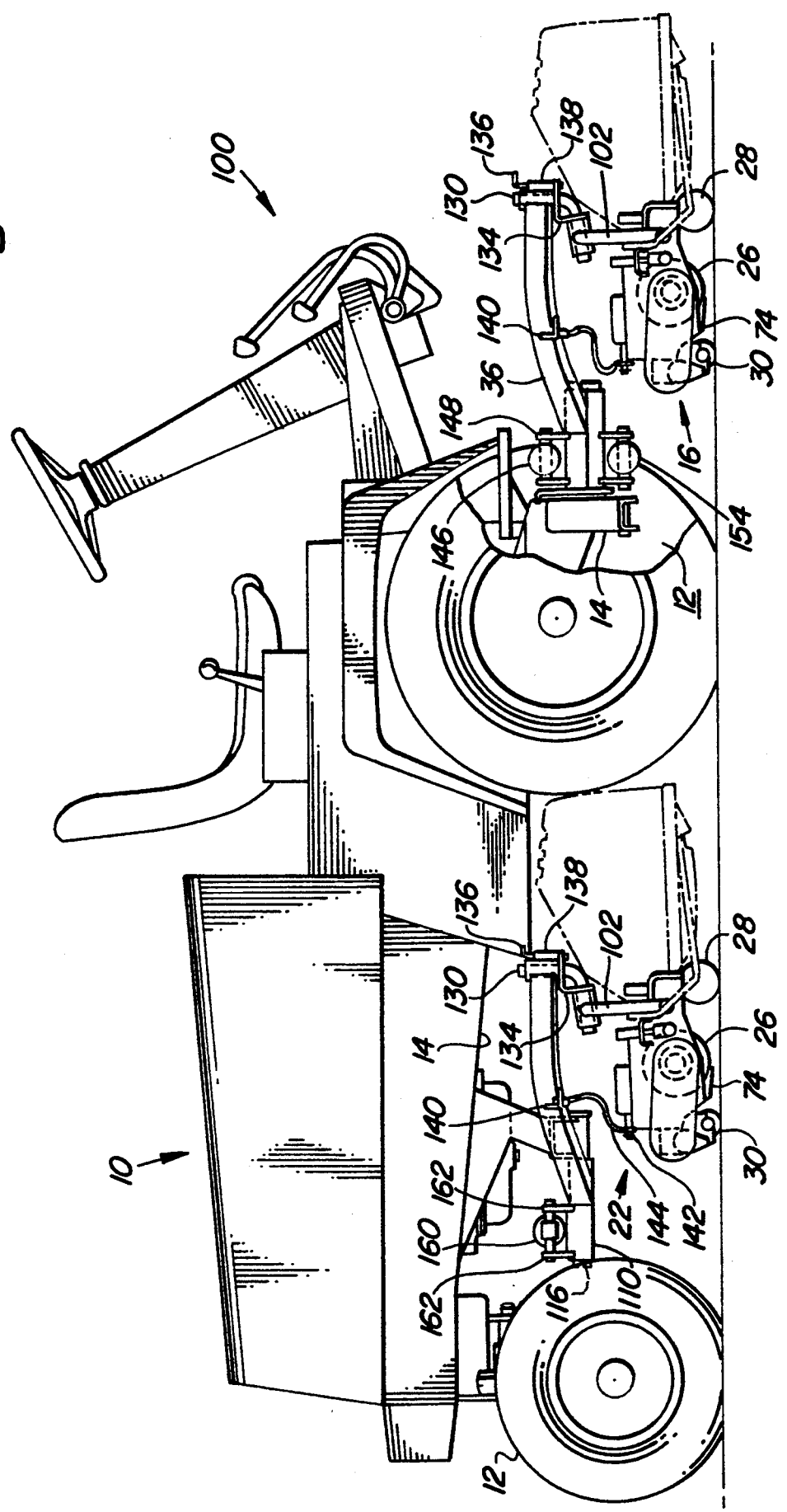

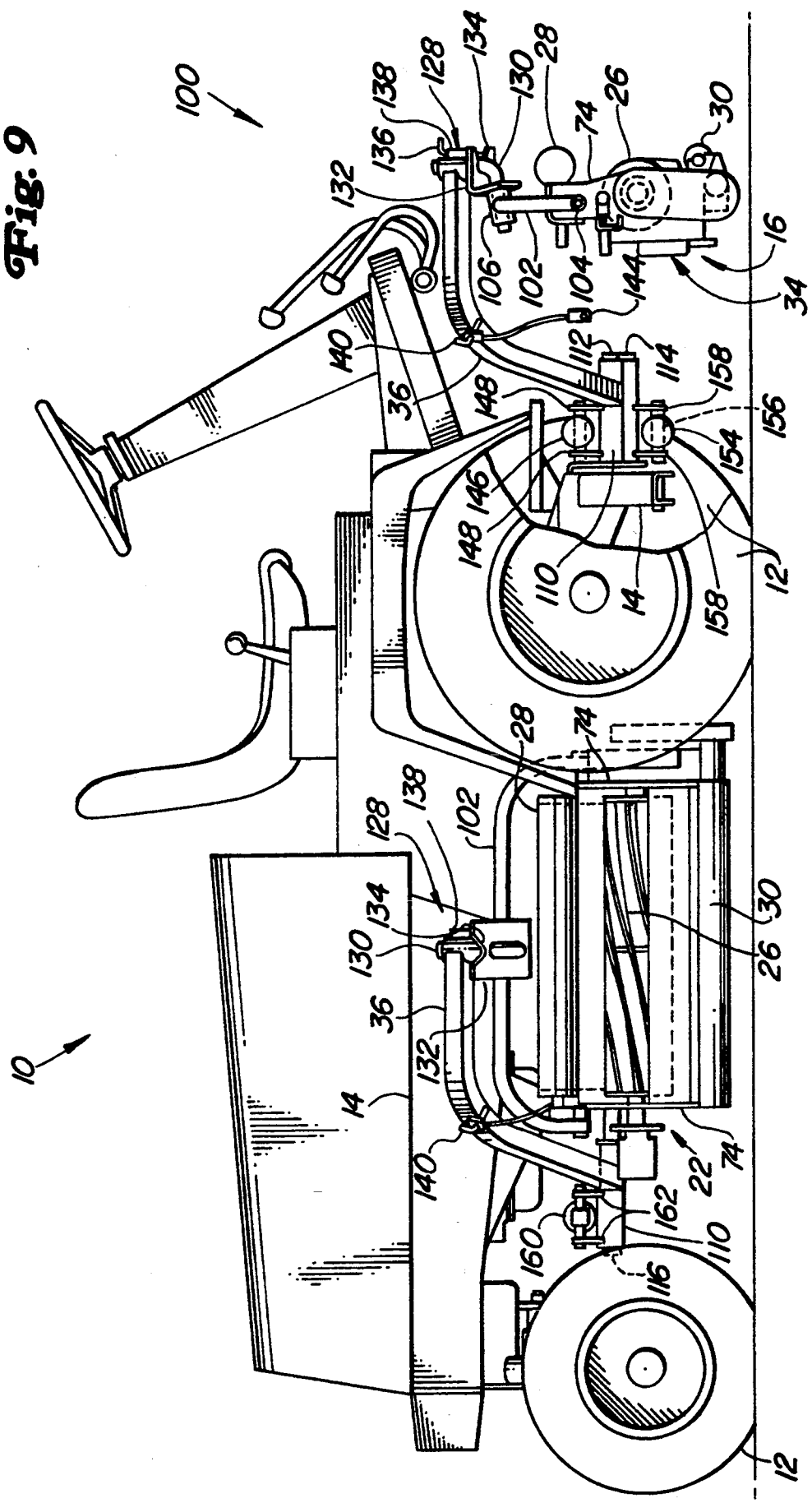

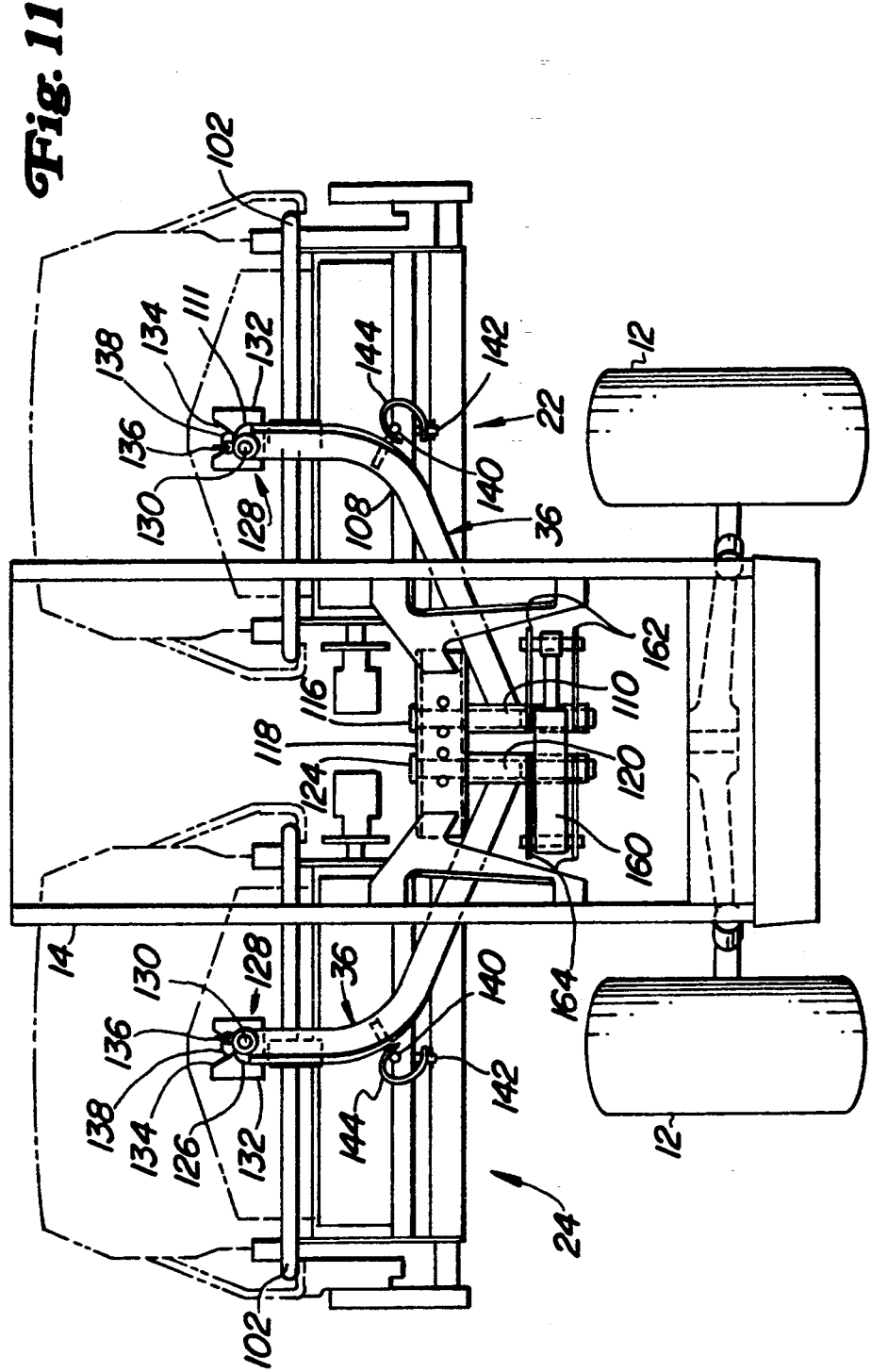

SUSPENSION MECHANISM FOR REEL MOWERS

BACKGROUND OF THE INVENTION

This invention relates to reel mowers and the mechanisms used to attach or suspend reel mowers from vehicles. Conventional reel mower vehicles include a plurality of arm members that extend from the vehicle, each arm having a reel-type cutting unit attached to its outer end portion. The reel-type cutting units typically include front and rear skids or rollers that support or carry the cutting units across the surface of the ground during mowing operation. Blades of the rotating reel interact with a bedknife to cut grass or other vegetation with a scissoring action.

Conventional mowing vehicles typically drag the cutting units across the ground adjacent the vehicle, and the grass beneath the cutting unit is mowed as the vehicle travels forward. A yoke is commonly coupled with the outer portion of each arm, and is also coupled to the cutting unit. The attachment point of the yoke to each cutting unit is typically located near the upper front portion of the side frames of the cutting units. The rear portions of these conventional reel mower cutting units typically experience a large degree of bouncing over irregular terrain. Also, the front rollers of these conventional mowers tends to dig down into the ground during forward travel. The front roller therefore tends to resist rising up over a bump in the ground, and will instead tend to dig down into a hill or bump. In an attempt to solve the above problems, springs have been included for biasing the rear of the cutting unit downwardly against the ground, thereby equalizing the weight carried by the front and rear rollers during forward travel and reducing the tendency of the front roller to dig or dip. These springs tend to add manufacturing and assembly costs to the vehicle. Furthermore, these springs typically must be released or otherwise detached to allow the cutting unit to be removed for service or repair, thereby complicating the removal process.

Reel mowers cut properly only if the reel to bed knife clearance is properly adjusted. Also, to produce an even cut, it is necessary that the height of cut be properly adjusted. Both of these adjustments require the person making the adjustment to access the bottom of the cutting unit. Specifically, a typical procedure for adjusting the bed knife clearance involves placing a single sheet of paper between the reel blade and bed knife and turning the reel by hand to cut the paper. The quality of the cut across the single sheet indicates whether the clearance is correct. The procedure for setting the cutting height typically involves fastening a gauge bar to the bed knife such that the upper surface of the bar is parallel to a forward, horizontal portion of the bed knife and at the desired distance below the cutting edge of the bed knife. The front and rear rollers are then adjusted to come into contact with the upper surface of the gauge bar.

Typically, the cutting units must be removed from the mower vehicle or frame in order to place the bottom of the cutting units in the line of sight of a technician for performing reel to bed knife and height of cut adjustments; or the technician must lie on his back beneath or just in front of the cutting unit when it is raised to its transport position. Obviously, neither one of these procedures is desirable, with the first consuming much valuable time and the other being quite difficult to perform.

SUMMARY OF THE INVENTION

The present invention provides a mechanism for allowing the operator to easily access the underside of the cutting units for service. A swing out feature is provided and includes a knuckle joint mechanism which allows the cutting units to swing downwardly when the lift arms are raised to a service position. The underside of the cutting units are exposed forwardly or to the side for allowing an operator to service the cutting units. The knuckle joint mechanism helps the operator easily switch the vehicle between its mowing mode and its service mode. The knuckle joint secures the cutting unit in relatively rigid position when the cutting unit is exposed for service. The present invention also includes a mechanism for hindering the cutting unit's front roller from dipping or digging into the ground during forward mowing operations, and for generally hindering the cutting unit's rear roller from bouncing up during forward travel. A particular connection point is provided at the upper rear quadrant of the cutting unit's side frame which generally balances the forces transmitted to the ground by the respective front and rear rollers for enhancing the cutting unit's ability to roll properly across the ground. Cut quality is thereby increased.

BRIEF DESCRIPTION OF THE DRAWINGS

FIG. 3 is a side elevation view of the right front cutting unit having a rearwardly located connection point and shown in its raised maintenance position.

FIG. 4 is a partial side view of the second embodiment of the knuckle joint during normal mowing operations.

FIG. 5 is a front view of the second embodiment of the knuckle joint during normal mowing operations.

FIG. 6 is a perspective view of the second embodiment of the knuckle joint removed from the vehicle.

FIG. 7 is a partial front view of the second embodiment of the knuckle joint in the released position, showing the lever pivoted downwardly and the first pins shifted inwardly.

FIG. 8 is a side view of a vehicle having a second embodiment of the swing out mechanism according to the present invention, the yokes being coupled to generally forward locations on the cutting units, the cutting units being shown in a ground engaging position for normal mowing operation.

FIG. 9 is a side view of the vehicle shown in FIG. 8, and having the cutting units raised to service positions.

FIG. 11 is a plan view of the rear cutting units shown in FIG. 8 and having the cutting units lowered to their mowing positions.

DESCRIPTION OF THE PREFERRED EMBODIMENT

Figure 1:
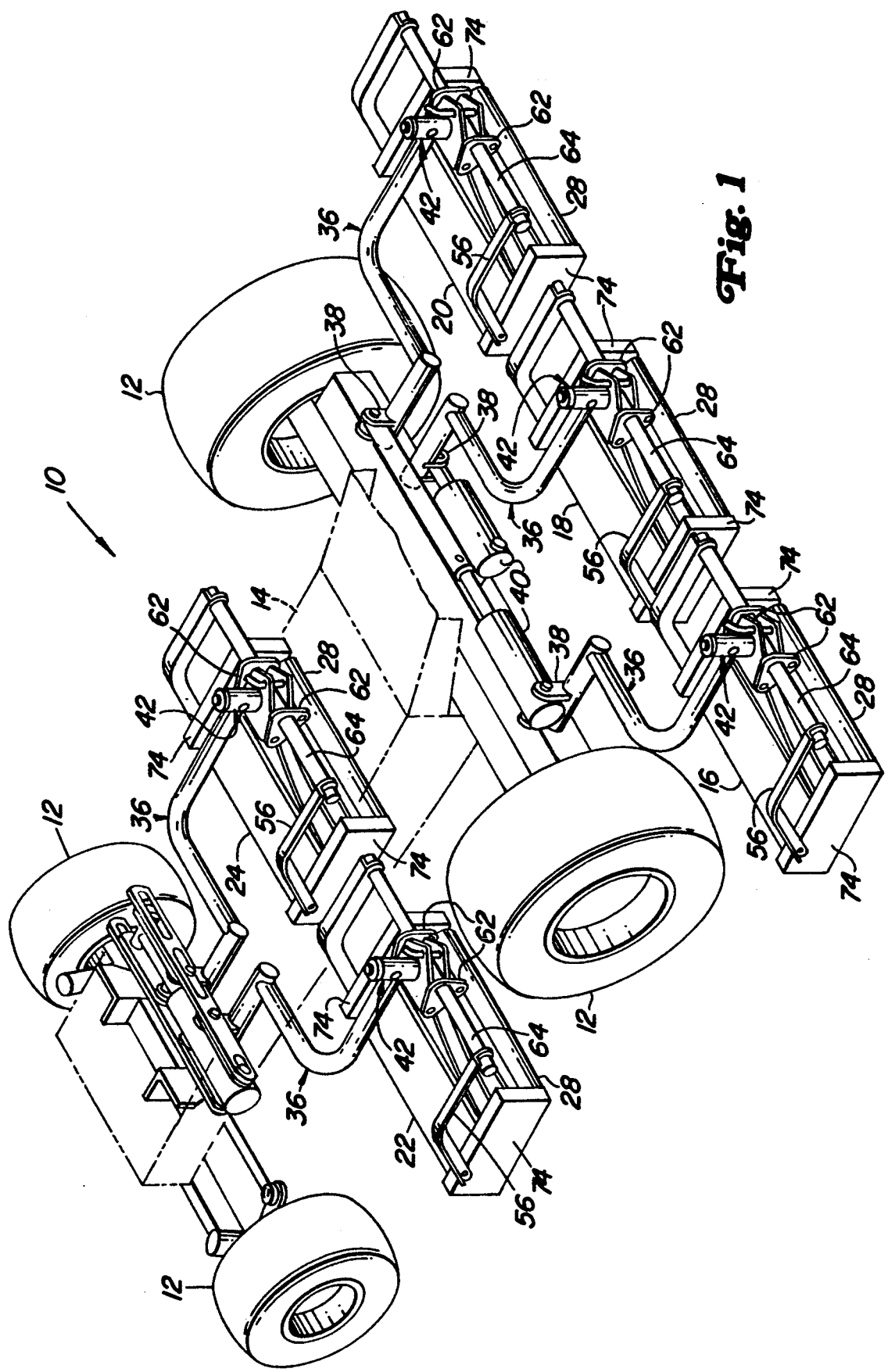
FIG. 1 is a partial perspective view of a mowing vehicle having thereattached an embodiment of the present invention which includes a rearwardly located connection point.

Referring now to FIG. 1, there is shown a partial view of a mowing vehicle 10 generally adapted for mowing golf course fairways, and having an embodiment of the present invention coupled thereto. The vehicle 10 includes a plurality of ground engaging wheels 12 and a frame 14. A plurality of reel mower cutting units 16, 18, 20, 22 and 24 are coupled with the vehicle 10 for mowing grass. The cutting units 16–24 each include a generally cylindrical cutting reel 26, and ground engaging front and rear support means or rollers 28 and 30 which support respective cutting units 16, 18, 20, 22 or 24 at the proper cutting height above the ground during mowing operations.

Figure 2:
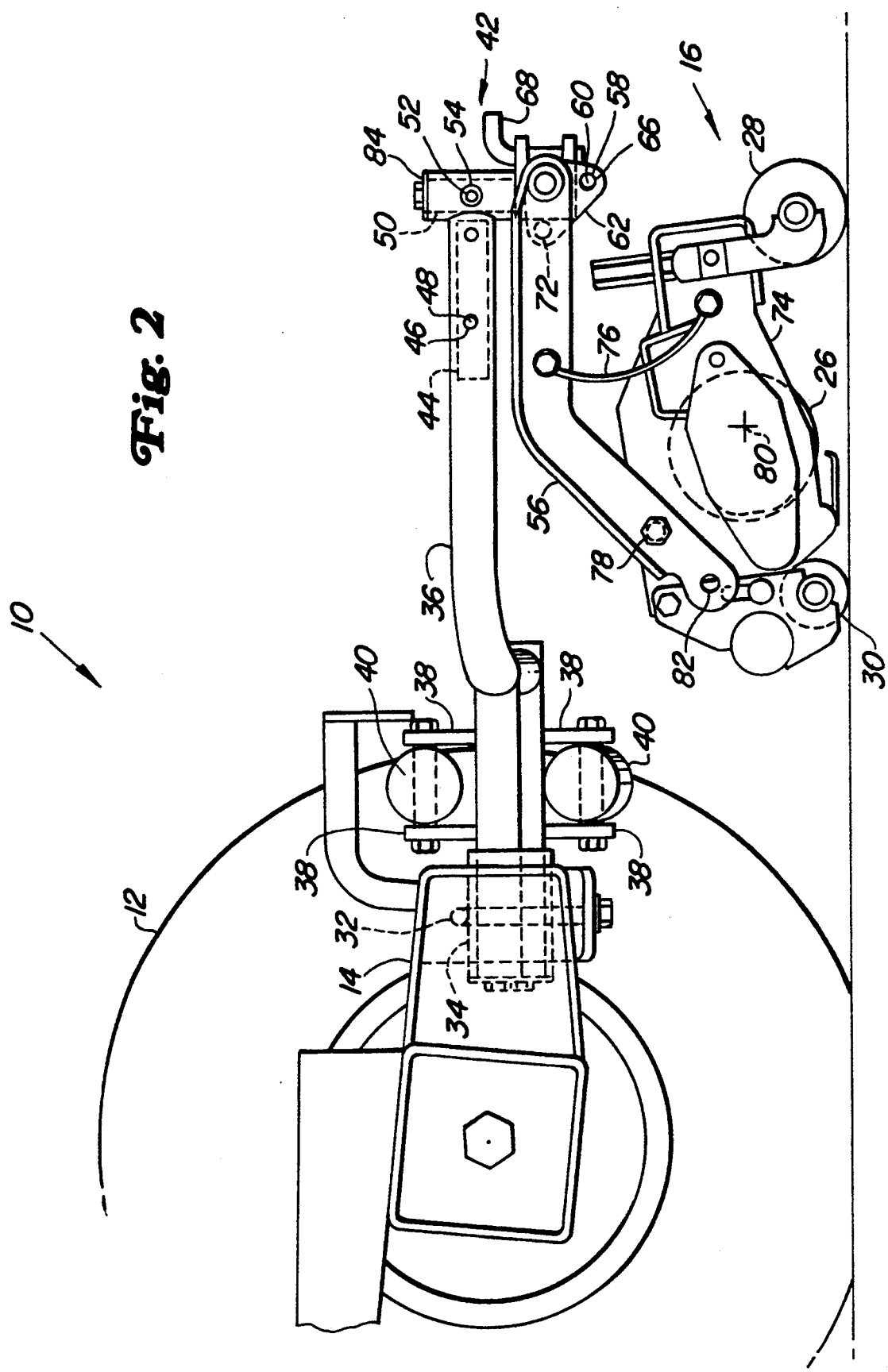
FIG. 2 is a side elevation view of the right front cutting unit in its ground engaging operating mode and having a rearwardly located connection point.

A mechanism is provided for operatively coupling the cutting units 16–24 with the vehicle 10, and also for raising and lowering the cutting units 16–24. As best seen in FIGS. 1 and 2, a portion of the frame 14 extends between the vehicle's front ground engaging wheels 12. Inverted U-shaped straps 32 shown in FIG. 2 serve to couple bushings 34 with the frame 14. The bushings 34 each pivotally receive a forwardly extending arm means 36. Crank members 38, best seen in FIG. 1, are fixed to each arm 36, and are engaged by a hydraulic cylinder 40 which selectively pivots the arms 36 to raise and lower respective cutting units 16–24 carried at the end portion of each arm 36. The hydraulic cylinders 40 are also adapted to apply a downforce to the arms 36 for operatively pressing the cutting unit 16–24 against the ground during mowing operations.

As seen in FIGS. 1 and 2, a pivotal coupling mechanism or knuckle joint 42 is carried at the forward end portion of the arm 36. The coupling mechanism 42 allows for pivotal motion about a generally horizontal axis defined by the end portion of the arm 36. A horizontal shaft 44 is received within the end portion of the arm 36 for allowing pivotal motion about a horizontal axis. A double conical opening 46 is defined in the horizontal shaft 44. A pin 48 is positioned within both the double conical opening 46 and an opening formed in the end portion of the arm 36 for securing the horizontal shaft 44 in position. The double conical shape of the opening 46 allows limited pivotal movement of the horizontal shaft 44. The knuckle joint 42 includes an upright shaft 50 pivotal about a vertical axis. A double conical opening 52, as best seen in FIG. 5, and a pin 54 received therein allow the upright shaft 50 to pivot throughout a limited range of motion. A yoke 56 is releasably pinned to the knuckle joint 42. The yoke 56 and cutting unit 16 thereattached pivot with the shaft 44 about the horizontal axis, and also pivot with the upright shaft 50 about the vertical axis.

The yoke 56 includes a set of pins 58 and 68, as best seen in FIG. 2, which can be removed to allow the yoke 56 and cutting unit 16 to swing downwardly with respect to the knuckle joint 42 to a service mode, and also allow the yoke 56 to be detached from the knuckle joint 42. A first pin 58 is received during mowing operations by first openings 60 defined in a pair of laterally spaced plates 62 which are fixed as by welds to the front bar 64 of the yoke 56. Openings 66 defined beneath the body portion of the knuckle joint 42 receive the first pin 58 for preventing the yoke 56 from pivoting with respect to the knuckle joint 42. When the first pin 58 is removed, the yoke 56 and cutting unit 16 thereattached are allowed to pivot downwardly with respect to the knuckle joint 42 when the arm 36 is raised, thereby exposing the underside of the cutting units 16–20 forwardly for service. A second pin 68 confines the yoke's front bar 64 within a groove 70 defined in the front portion of the knuckle joint 42. The second pin 68 can be removed to allow the yoke 56 and cutting unit thereattached to be removed from the vehicle 10.

The laterally spaced plates 62 also define second openings 72. When the yoke 56 swings downward to its maintenance position while the arm 36 is in a raised position, the second openings 72 in the laterally spaced plates 62 can be aligned with the openings 66 in the knuckle joint 42 for insertion of the first pin 58. With the first pin 58 inserted in the second opening 72 and the knuckle joint's opening 66, the yoke 56 is rigidly held against pivotal motion such that an operator can make adjustments to the exposed underside of the cutting unit.

The yoke 56 extends rearwardly on either side of the cutting unit to be pivotally connected to the rear portion of each of the laterally spaced side frames 74 of the cutting unit. A releasable cord or flexible member 76 extends between a forward portion of the cutting unit and the yoke 56 for maintaining the cutting unit in a generally horizontal position when the arms 36 are raised. When the arm 36 is raised to a transport position, the cable or cord 76 maintains the cutting unit in a generally horizontal position such that when the arm 36 is again lowered for mowing operations the cutting unit will come in contact with and ride across the ground properly. Also, as the arm 36 is raised to a service position and the yoke 56 pivots downwardly, the cord 76 prevents the cutting unit from swinging downwardly with respect to the yoke 56. The bottom of the cutting unit is thereby exposed forwardly when the yoke 56 swings downwardly for service. The flexibility of the cord 76 allows the cutting unit to pivot with respect to the yoke 56 as undulations in ground contour are encountered during mowing operations.

Referring now to FIG. 2, the operation of the rearward attachment point of the yoke to the cutting unit will next be discussed. When the vehicle 10 travels forward during mowing operations, the rollers 28 and 30 encounter resistance as they roll across the ground. The rolling resistance force is applied to the cutting unit 16 at the axis of the rollers 28 and 30, and is directed rearwardly and horizontally during forward travel of the vehicle 10. Rolling resistance changes with the velocity of the vehicle 10 and ground conditions. The connection point 78 about which the cutting unit pivots with respect to the yoke 56 is located a distance above the axis of the front roller 28. Therefore, the rolling resistance force encountered at the front roller 28 acts to urge or force the front portion of the cutting unit 16 to pivot rearwardly and downwardly about the connection point 78 in a clockwise direction as viewed in FIG. 2. The rolling resistance encountered by the rear roller 30 acts to urge or force the rear portion of the cutting unit to pivot rearwardly and upwardly about the connection point 78, also in the clockwise direction as viewed in FIG. 2, thereby further causing the cutting unit's front portion to dip downwardly. Rolling resistance therefore acts to force the front portion of the cutting unit 16 downwardly against the ground such that it may dip down or dig into the ground.

However, the present invention acts to reduce the tendency of the front portion of the cutting unit to dip or dig downwardly. The downforce which is applied to the cutting unit via the hydraulic cylinders 40 and the weight of the arms is transmitted through the connection point 78. The connection point 78 is located between the rollers 28 and 30 but closer to the rear roller 30 than the front roller 28, and is behind the cutting unit's center of gravity 80. The rearward location of the connection point 78 serves to distribute a greater portion of the downforce to the rear roller 30 than to the front roller 28. When the vehicle 10 is stationary, the force transmitted to the ground through the rollers 28 and 30 results from the weight of the cutting unit and the downforce applied through the connection point 78. Since the connection point 78 is closer to the rear roller 30 than the front roller 28, a greater portion of the downforce is transmitted to the ground through the rear roller 30 than through the front roller 28. Therefore, when stationary the cutting unit transmits more force to the ground through the rear roller 30 than through the front roller 28. However, when the mower is traveling forward, the rolling resistance acts to increase the amount of force applied to the ground through the front roller 28, since the rolling resistance urges the front portion of the cutting unit downwardly and the rear portion of the cutting unit upwardly. During operation of the present invention, the rolling resistance will act to increase the amount of force transmitted to the ground through the front roller 28 to an extent that the forces transmitted to the ground through the front and rear rollers 28 and 30 become generally equal or balanced. The tendency of the front portion of the cutting unit to dip or dig is therefore reduced, and cut quality is generally enhanced.

The pivotal connection point 78 can be positioned at a variety of different locations to yield generally equal or balanced force distribution at the rollers 28 and 30 during forward travel. For example, the connection point 78 shown in FIG. 2 could be positioned at a lower position than shown. The lower location would decrease the vertical distance between the connection point 78 and the axis of the front roller 28. This distance is the "lever arm" or moment arm at which rolling resistance is applied, resulting in the cutting unit being urged to pivot about the connection point. The smaller the lever arm, the smaller will be the moment which pivots the cutting unit about the connection point and presses the front portion of the cutting unit downwardly against the ground. Therefore, since the cutting unit has less tendency to dip due to the lower connection point, the connection point should be positioned farther forward, since a smaller portion of the downforce needs to be applied to the rear roller to achieve general balance between rollers. Lower connection points should therefore be positioned nearer the midpoint of the rollers 28 and 30, and higher connection point locations should be positioned nearer the rear roller 30.

Each connection point of the present invention is located at the upper rear quadrant of a respective side frame 74. The connection point 78 could be located at particular positions above the top edge of the side frame 74 and still serve to equalize the force transferred to the ground by the front and rear rollers 28 and 30. However, additional structure would have to be coupled with the side frame 74 to establish such an attachment location, thereby adding manufacturing expense to the mechanism. The upper rear quadrant of the side frame is a location which is not crowded with other components, such as cutting height adjustment mechanisms or hydraulic motors which are carried on the side of the side frames. Therefore, the upper rear quadrant provides a convenient location for coupling the yoke 56 to the side frame 74. The pivotal connection point 78 could be positioned laterally outwardly from structures such as the hydraulic motor, but additional framework or structure would have to be built onto the side frame 74 to establish such a connection point, thereby increasing the complexity and cost of the mechanism.

The particular cutting unit shown in FIG. 2, has front and rear rollers 28 and 30 spaced 282.5 mm apart. The front roller 28 has a 3 inch diameter, and the rear roller 30 has a 2 inch diameter. The cutting unit weighs approximately 90 pounds, of which about 48.9 pounds are distributed to the rear roller 30, and about 40.9 pounds are distributed to the front roller 28. The center of gravity 80 is located 52.3 mm above and 123.7 mm in front of the rear roller 30. The pivotal connection point 78 is located about 118 mm above and 48 mm in front of the rear roller 30. The downforce which the hydraulic cylinder 40 operatively applies to the cutting unit is about 30 pounds, and the downforce applied due to the weight of the arm is 13 pounds. The recommended vehicle speed during mowing operations is 5 miles per hour.

Different cutting units have different characteristics such as static weight distributions between the front and rear rollers, or different centers of gravity. Therefore, the pivotal connection points of cutting units having different characteristics may have to be positioned at different locations to achieve balanced force distribution at the rollers during forward travel. The yoke shown in FIG. 2 is provided with an auxiliary opening or coupling location 82 adapted for receiving a cutting unit having a different size, weight and center of gravity.

Rolling resistance will vary with the speed of the vehicle 10 and variations in ground conditions. Therefore, the particular force distribution between the front and rear rollers 28 and 30 will vary somewhat at different operating speeds and ground conditions.

The hydraulic cylinders 40 can be operated to raise the arms 36 to a transport position whereat the cutting units 16–24 are raised off the ground. As the arm 36 is raised, the cord 76 prevents the front portion of the cutting unit from pivoting downwardly with respect to the yoke 56. The cutting unit thereby remains in a relatively horizontal position such that it will smoothly and properly engage the ground once it is again lowered to resume mowing operations.

Next, the operation of the cutting units to their swing-out service position will be discussed. The cutting units 16–24 can be raised to a maintenance or service position whereat the underside of the cutting unit is exposed to facilitate adjustments such as reel to bedknife adjustments. In order to raise the cutting units 16–24 to the service position, an operator removes the first pin 58 and the pin 48 received by the horizontal shaft 44. The operator then raises the arm 36 via the hydraulic cylinder 40. As the arm 36 raises, the horizontal shaft 44 pivots within the end portion of the arm 36. Furthermore, due to the absence of the first pin 58, the weight of the cutting unit causes the yoke 56 and cutting unit to pivot downwardly and forwardly with respect to the arm 36. As the arm 36 continues to be raised, the cutting unit is eventually lifted off the ground. The cord 76 insures that the bottom of the cutting unit will be facing forwardly as the cutting unit is lifted. The second openings 72 in the laterally spaced plates 62 can be aligned with the knuckle joint's opening 66, and the first pin 58 inserted for rigidly securing the yoke 56 in the service position shown in FIG. 3. The reel and bedknife which are positioned at the bottom or underside of the cutting unit during operation are now exposed forwardly for service and held firmly in place by the first pin 58.

To raise the rear cutting units 22 and 24 to a maintenance position whereat the undersides of the rear cutting units 22 and 24 are exposed for service the operator removes the pin 54 carried by the upright shaft 50, and removes the first pin 58. With the pin 54 removed from the upright shaft 52, the yoke 56 and rear cutting unit 22 or 24 can be pivoted about the upright shaft's pivot axis. The operator can then raise the arm 36 by controlling the hydraulic cylinder 40. With the first pin 58 removed, the yoke 56 and rear cutting unit 22 or 24 will pivot downwardly with respect to the knuckle joint 42 as the arm 36 is raised. An oversized washer 84 bolted to the top of the upright shaft 50 prevents the upright shaft 50 from sliding out of the body of the knuckle joint 42. Since the yoke 56 and rear cutting unit 22 or 24 have been pivoted about the axis of the upright shaft 52, the bedknife and reel carried on the underside of the rear cutting unit 22 or 24 are exposed outwardly from the vehicle 10 as the arm 36 is raised. An operator is thereby provided with improved access to the rear cutting units 22 and 24 for maintenance. The yoke 56 can be pivoted to align the second opening 72 of the plate 62 with the knuckle joint's opening 66, and the first pin 58 can be inserted for rigidly securing the yoke 56 and rear cutting unit 22 or 24 in the service position.

To lower the cutting unit 16–24 to its mowing position, the operator removes the first pin 58. The yoke 56 and cutting unit pivot slightly rearwardly from the position shown in FIG. 3 until the cutting unit's center of gravity 80 falls generally directly beneath the axis of the front bar 64 about which the yoke 56 and cutting unit are pivoting. As the operator lowers the arm 36 via the hydraulic cylinders 40, the rear roller 30 contacts the ground at a location rearwardly of the axis of the front bar 64, which is the point about which the yoke and cutting unit are pivoting. Therefore the cutting unit will pivot rearwardly when it contacts the ground. Once both rollers of the cutting unit are firmly on the ground again, the first pin 58 can be reinserted through the first opening 60 for rigidly securing the yoke 56 with the knuckle joint 42.

Referring now to FIGS. 4–7, there is shown a second embodiment 86 of the knuckle joint. A groove 70 and second pin 68 are provided for pivotally confining the front bar 64 of the yoke 56. A pair of first pins 88 are biased outwardly by a rod-like lever 90 which extends through each of the first pins 88. To shift the pins 88 inwardly, the lever 90 is pivoted downwardly. The end portions 92 of the lever 90 engage ramp means 94 formed in the knuckle joint 86. The end portions 92 of the lever 90 are pressed or shifted inwardly toward each other as the lever 90 pivots downwardly. The first pins 88 shift inwardly with the end portions 92 of the lever 90, and thereby become removed from the first openings 60 in the laterally spaced plates 62.

As the operator pivots the lever 90 downwardly, the end portions 92 of the lever 90 shift past the ramped portion 94 and onto a flatted portion 96 where the lever 90 will generally remain stationary. With the first pins 88 disengaged from the first openings 60 of the plates 62, the yoke 56 is allowed to pivot downwardly when the arm 36 and cutting unit are raised for service. When the cutting unit is lifted off the ground, the operator can pivot the lever 90 upwardly, thereby pressing or biasing the first pins 88 outwardly against the plates 62. The operator may need to manually pivot the yoke 56 forwardly slightly with respect to the plates 62 in order to align the first pins 88 with the second openings 72. The first pins 88 are biased outwardly and will spring outwardly into the second opening 72 when proper alignment is achieved. The biasing action of the lever 90 eliminates the need for the operator to manually reinsert the first pin at the same time he is pivoting the yoke 56 to the proper alignment. Manipulating the yoke 56 and cutting unit to its rigidly secured service position is therefore facilitated.

When the cutting unit is to be returned to its mowing configuration, the lever 90 is pivoted downwardly to disengage the first pins 88 from the second openings 72 in the plates. The cutting unit's center of gravity 80 pivots rearwardly to a position generally beneath the front bar 64. The rear roller 30 is therefore positioned behind the pivot point such that as the arm 36 is lowered via the hydraulic cylinder 40 the cutting unit will pivot rearwardly to its mowing position when the ground is contacted. Once lowered, the lever 90 is again shifted upwardly to bias the first pins 88 outwardly. The first pins 88 will engage the first openings 60 in the plates 62 once proper alignment is achieved.

Referring now to FIGS. 8–11, there is shown a second embodiment 100 of the swing out feature of the present invention. Mounted for being towed or carried by the vehicle are right, central and left front cutting units 16, 18 and 20 respectively, and right and left rear cutting units 22 and 24, respectively. Each cutting unit includes opposite side frames 74. Extending between and being rotatably mounted in the side frames 74 is a cutting reel 26. The correct height of cut is maintained by front and rear rollers 28 and 30, respectively, which have their opposite ends mounted to the side frames 74 by respective mounting assemblies which provide vertical adjustment. Associated with each cutting unit is a drag or trailing link structure in the form of a yoke 102 having opposite ends pivotally connected, as by pins 104, to the side frames 74 whereby a horizontal pivot axis or connection point is established between the yoke 102 and the cutting unit. Forming a portion of the yoke 102 and being located centrally between the opposite ends thereof is a cylindrical tubular receptacle 106 which is used for mounting the yoke 102 to lift arms 36 of the vehicle 10 in a manner described in more detail below.

Figure 10:
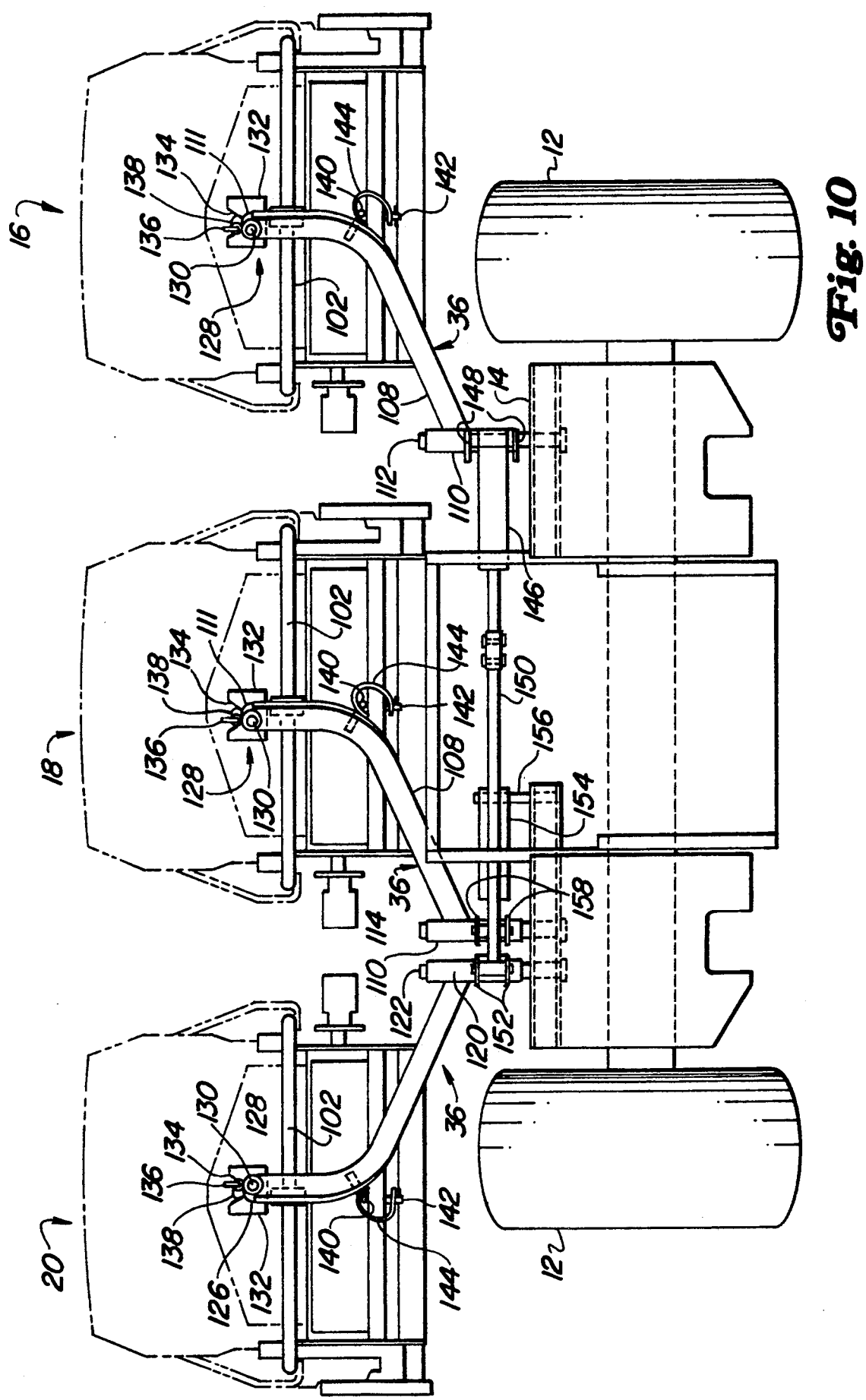
FIG. 10 is a plan view of front cutting units shown in FIG. 8 and having the cutting units lowered to their mowing positions.

As viewed in FIGS. 10 and 11, each of the arms 36 include an elongate intermediate section 108 constructed of tubular stock having a square cross-section and being bent so as to be substantially L-shaped, with its long leg extending outwardly at about a 65° angle to the direction of travel and with its short leg extending in the direction of travel. Forming inner and outer ends of each of the arms 36 are cylindrical tubular receptacles 110, 111 respectively. The receptacles 110 are horizontally disposed with the receptacle of the right front arm 36 being pivotally received on a horizontal, fore-and-aft extending right front pivot pin 112 located on the mower frame 14 inwardly of the right wheel 12 to thereby establish a pivotal connection with the frame 14 about which the arm 36 is vertically swingable. Similarly, the receptacle 110 of the central front arm 36 is pivotally received on a horizontal, fore-and-aft extending central front pivot pin 114 located on the mower frame 14 inwardly of the left front wheel 12 a distance slightly greater than the right front pivot pin 112 is from the right front wheel and at an elevation slightly below that of the pivot pin 112. The receptacle 110 of the right rear arm 36 is pivotally received on a horizontal, fore-and-aft extending right rear pivot pin 116 mounted to a cross member 118 of the frame 14 disposed just forwardly of the rear wheels 12 at a location just to the right of the fore-and-aft centerline of the main frame 14.

Similarly, the left front arm 36 and the left rear arm 36 are each constructed of an elongate tubular member of square cross section bent into an L-shape with the longer leg extending outwardly at an angle of about 65° with respect to the direction of travel and with the shorter leg extending in the direction of travel. A cylindrical tube forms a receptacle 120 at the inner end of each of the arms 36 with the receptacle 120 of the arm 36 being received on a horizontal, fore-and-aft extending left front pivot pin 122 mounted to the frame 14 at a location inwardly of the left front wheel 12 which mirrors the location of the right front pivot pin 112 and with the receptacle 120 of the arm 36 being pivotally received on a horizontal, fore-and-aft extending left rear pivot pin 124 mounted to the cross frame structure 118 at a location just to the left of the centerline of the frame 14 so as to be in side-by-side relationship to the pivot pin 116. Cylindrical tubes form receptacles 126 which are each oriented upwardly and inclined slightly inwardly.

The arms 36 are respectively coupled to the cutting units 16-24 by identical coupling structures 128. Each coupling structure 128 includes a v-shaped coupling pin 130 having a first limb pivotally received in a respective one of the outer receptacles 111, 126 and has a second limb pivotally received in the receptacle 106 of the yoke 102 of a respective one of the cutting units 16-24. Keys or pins (not shown) are received in holes provided in opposite ends of the coupling pin 130 so as to maintain the respective connections between the arms 36 and the yokes of the cutting units 16-24. A v-shaped plate 132 has a first leg received on the coupling pin 130 at a location beneath the associated receptacle 111, 126 and has a second leg received on the coupling pin at a location in front of the respective yoke receptacle 106. A v-shaped notch 134 is formed in the front end of the first leg of the plate 132 and a stop or limit pin 136 extending downwardly through a receptacle 138, provided on the forward side of the yoke receptacle 111, and into the v-shaped notch serves to limit the amount that the respective cutting unit 16-24 and coupling pin is permitted to swivel during turning of the reel mower 10 so as to ensure that the cutting unit tracks properly relative to the other units so as not to leave a strip of uncut grass. The pin 136 may be withdrawn from the receptacle 138 so as to permit the unit to be turned to a more favorable attitude for servicing in a manner described in more detail below. Respectively connected between a hook 140 formed at the bend of each of the arms 36 and a pin 142 welded to a central location of an upper cross member of the frames of each of the cutting units 16-24 is a flexible lift member 144 here shown as a cable having clevises at opposite ends thereof. The lift member 144 acts to keep the cutting units substantially level when they are raised from their lowered working positions to transport positions, for example. It is noted that a chain may be substituted for each of the lift cables if desired.

A power lift means is provided for raising and lowering the cutting units 16-24 from and to their working positions shown in FIG. 9. Specifically, the power lift means includes a first, extensible and retractable hydraulic cylinder 146 having its head end pinned to a pair of upstanding cranks 148 provided on the rear portion of the inner receptacle 110 of the right front arm 36. The rod end of the cylinder 146 is coupled to a rod extension 150 having its free end pinned to a pair of upstanding cranks 152 provided on the rear portion of the inner receptacle 120 of the left front arm 36. Thus, it will be appreciated that retraction of the cylinder 146 will result in the right and left front arms 36 being rotated about the pivot pins 112 and 122 so as to exert a lifting force on the trailed cutting units 16 and 20 by way of the yokes 102 and the flexible lift members 144. The central front cutting unit 18 is similarly lifted through means of an extensible and retractable hydraulic cylinder 154 having its head end pinned to the frame 14, as at 156, and having its rod end pinned to a pair of cranks 158 depending from the rear portion of the inner receptacle 110 of the central front arm 36. Retraction of the cylinder 154 will result in the lift arm 36 being swung vertically about the pivot pin 114 so as to exert a lifting force on the yoke of the trailed cutting unit 18 and on the lift member 144.

The rear cutting units 22 and 24 are raised and lowered through operation of a rear extensible and retractable hydraulic cylinder 160 having its rod end pinned to a pair of upstanding cranks 162 provided on the right receptacle 110 and having its head end pinned to a pair of upstanding cranks 164 provided on the left rear arm 36. Thus, it will be seen that retraction of the cylinder 160 will result in the right and left rear arms 36 being swung upwardly about the pivot pins 116 and 124 so as to exert a lifting force on the right and left rear cutting units 22 and 24 by way of the respective yokes 102 and lift members 144.

The lifting means for the cutting units 16-24 is used for placing the units in a desired attitude for servicing. For example, assuming the cutting units to be in their lowered working positions, as shown in FIG. 8, the right front cutting unit 16 may be placed in an attitude for checking its height of cut and/or the clearance between the bed knife and reel 26 by first disconnecting the lift member 144 from the cutting unit frame and removing the grass catcher and bail. The hydraulic cylinder 146 is then actuated to cause it to extend and raise the lift arm 36 resulting in the yoke being elevated to the extent that the cutting unit 16 is suspended in the air with the rear roller 30 being raised above the ground, as shown in FIG. 9. The front roller 28, rear roller 30, reel 26 and bed knife are then clearly visible to a technician positioned at the front of the machine so that the height of cut and bed knife clearance may be checked by any well known method.

Assuming that it is also desired to check the height of cut and/or the bed knife clearance of the right rear cutting unit 22, the same procedure of disconnecting the lift member 144 and of removing the grass catcher from the cutting unit is followed. In addition, the stop or limit pin 136 is removed from its receptacle 138. The hydraulic cylinder 160 is then retracted to effect vertical swinging of the right rear lift arm 36 and hence, the lifting of the cutting unit 22 above the ground. The cutting unit 22 is then grasped and rotated 90° clockwise, together with the coupling pin 130 about the axis of that limb of the pin which is located in the outer receptacle 111 of the arm 36. The front roller 28, rear roller 30, reel 26 and bed knife are then disposed outwardly, as shown in FIG. 9, so as to be in full view of a technician standing at the right side of the mower 10.

Thus, it will be appreciated that the suspension of the cutting units 16-24 from the main frame 14 of the mower 10 permits them to be easily accessed for servicing and in particular for the checking and adjustment if necessary of the height of cut or of the bed knife to reel clearance.

I claim:

1. A mower, comprising:
    a reel mower cutting unit having front and rear portions, and a center of gravity, and front and rear support means for supporting the cutting unit on the ground during mowing operation,
    an arm pivotally coupled with the cutting unit at a pivotal connection point,
    said pivotal connection point being located to the rear of the cutting unit's center of gravity and above the front and rear support means for generally equalizing the force transmitted to the ground by the front and rear support means during forward travel.

2. The invention of claim 1, and further comprising a downforce applying means operatively coupled with the arm for applying a downward force to the cutting unit during operation.

3. The invention of claim 2, wherein the location of the pivotal connection point above the front and rear support means causes the front portion of the cutting unit to press downwardly against the ground due to ground resistance during forward travel, and the location of the pivotal connection point through which the downward force is applied to the cutting unit is behind the cutting unit's center of gravity for applying a greater portion of the downforce to the rear support means than the front support means for generally equalizing the amount of force applied to the ground by the front and rear support means during forward travel and thereby generally counteracting the tendency of the front portion to dip.

4. The invention of claim 3, wherein the front and rear supports are each transversely extending rollers.

5. The invention of claim 4, and further including a side frame positioned at a lateral edge portion of the cutting unit, said pivotal connection point being coupled directly to the side frame.

6. The invention of claim 1, wherein the pivotal connection point is located at an upper rear quadrant of the side frame.

7. A reel mower suspension mechanism for use with a vehicle, comprising:
    a reel mower cutting unit having front and rear portions, said cutting unit including:
    at least one side frame,
    a ground engaging front roller coupled with the front portion of the cutting unit for generally supporting the front portion of the cutting unit during mowing operation,
    a ground engaging rear roller coupled with the rear portion of the cutting unit for generally supporting the rear portion of the cutting unit during mowing operation, and
    an arm coupled with the vehicle and operatively coupled with the side frame of the cutting unit at a pivotal connection point, said pivotal connection point being located to the rear of the cutting unit's center of gravity and above the front and rear rollers for generally equalizing the force transmitted to the ground by the front and rear support means during forward travel of the vehicle and cutting unit, thereby reducing the tendency of the front portion of the cutting unit to dip during forward travel.

8. The invention of claim 7, wherein the pivotal connection point is coupled with an upper rear quadrant of the side frame.

9. The invention of claim 7, wherein the pivotal connection point is located beneath a top edge of the side frame.

10. The invention of claim 7, wherein
    the cutting unit further includes a pair of side frames laterally spaced from each other,
    a yoke is pivotally coupled with each side frame of the cutting unit, and respective pivotal connection points couple each side frame with the yoke, and
    said arm is coupled between the vehicle and the yoke for propelling the cutting unit with the vehicle.

11. The invention of claim 10, wherein the yoke is pulled by the arm during forward vehicle travel.

12. The invention of claim 7, and further comprising a downforce applying means operatively coupled with the arm for applying a downward force to the cutting unit during operation.

13. A reel mower suspension mechanism for use with a vehicle, comprising:
    a reel mower cutting unit having front and rear portions, said cutting unit including:
    a pair of laterally spaced side frames,
    a ground engaging front roller coupled with the front portion of the cutting unit for generally supporting the front portion of the cutting unit during mowing operation,
    a ground engaging rear roller coupled with the rear portion of the cutting unit for generally supporting the rear portion of the cutting unit during mowing operation, and
    an arm means coupled with the vehicle,
    a yoke means operatively connected between each side frame and the arm means for operatively coupling the cutting unit with the vehicle, a downward force being applied to the cutting unit via said yoke and arm means, and said yoke being pivotally coupled with the cutting unit at a location closer to the rear roller than the front roller for transmitting a greater portion of the downward force to the rear roller than the front roller and generally equalizing the weight carried by the front and rear rollers during forward travel for reducing the tendency of the front portion of the cutting unit to dip during forward travel.

14. The invention of claim 13, wherein the yoke means is coupled directly to an upper rear quadrant of each side frame.

15. A mower mechanism couplable to a vehicle, comprising:
    an arm means pivotally coupled with the vehicle,
    a reel mower cutting unit having an underside which must be accessed for service, said cutting unit being operatively coupled with the arm means for being propelled with the vehicle, said arm means being pivotal to raise the reel mower off the ground to a service position,
    a yoke coupled between the cutting unit and the arm means, said cutting unit being generally pivotal with respect to the yoke, a member coupled with the cutting unit for maintaining the cutting unit in generally horizontal position when the arm means is raised to a transport position, and first releasable locking means for generally securing the yoke against excessive pivoting with respect to the arm means during mowing operations, said first locking means being releasable to allow the yoke to pivot downwardly with respect to the arm means when the arm means is raised to a service position for exposing the underside of the cutting unit for service.

16. The invention of claim 15, and further including a second releasable locking means which restricts excessive pivoting of the yoke about a generally vertical axis with respect to the arm means during mowing operation, said second locking means being releasable for allowing the yoke to pivot to expose the underside of the cutting unit laterally outwardly from the vehicle when the arm means is raised to its service position.

17. The invention of claim 15, wherein the yoke is coupled to the rear of the center of gravity of the cutting unit.

18. The invention of claim 17, wherein the member prevents the cutting unit from pivoting downwardly with respect to the yoke when the arm is raised to the service position.

19. The invention of claim 17, and further comprising front and rear ground engaging rollers, said yoke being coupled to the cutting unit at a location closer to the rear ground engaging roller than the front ground engaging roller.

20. The invention of claim 19, wherein the member extends between the cutting unit and yoke for preventing the cutting unit from pivoting dowardly with respect to the yoke when the arm is raised to the service position.

21. The invention of claim 19, wherein the member extends between the cutting unit and yoke for preventing the cutting unit from pivoting downwardly with respect to the yoke when the arm is raised to the service position.

22. A mower mechanism couplable to a vehicle, comprising:

an arm means pivotally coupled with the vehicle, a reel mower cutting unit having an underside which must be accessed for service, said cutting unit being operatively coupled with the arm means for being propelled with the vehicle, said arm means being pivotal to raise the reel mower off the ground to a service position, a yoke coupled between the cutting unit and the arm means, said yoke being coupled to the rear of the center of gravity of the cutting unit, and said cutting unit being generally pivotal with respect to the yoke, a member coupled with the cutting unit for maintaining the cutting unit in generally horizontal position when the arm means is raised to a transport position, wherein the member generally prevents the cutting unit from pivoting downwardly with respect to the yoke when the arm is raised to a service position, first releasable locking means for generally securing the yoke against excessive pivoting with respect to the arm means during mowing operations, said first locking means being releasable to allow the yoke to pivot downwardly with respect to the arm means when the arm means is raised to a service position for exposing the underside of the cutting unit for service.

23. The invention of claim 22, and further including a second releasable locking means which restricts excessive pivoting of the yoke about a generally vertical axis with respect to the arm means during mowing operation, said second locking means being releasable for allowing the yoke to pivot to expose the underside of the cutting unit laterally outwardly from the vehicle when the arm means is raised to its service position.

24. The invention of claim 23, and further comprising front and rear ground engaging rollers, said yoke being coupled to the cutting unit at a location closer to the rear ground engaging roller than the front ground engaging roller.

25. A mower mechanism couplable to a vehicle, comprising:

an arm means pivotally coupled with the vehicle, a reel mower cutting unit having an underside which must be accessed for service, said cutting unit being operatively coupled with the arm means for being propelled with the vehicle, said arm means being pivotal to raise the reel mower off the ground to a transport position and a service position, and a releasable member coupled with the cutting unit for maintaining the cutting unit in generally horizontal position when the arm means is raised to the transport position, said member being releasable to allow the cutting unit to swing downwardly with respect to the arm means to expose the underside of the cutting unit for service when said arm means is raised to the service position.

26. A reel mower including a main frame, an arm means vertically pivotally mounted to the main frame and a trailing link coupled to an end of the arm means, and a cutting unit having a frame supporting a reel and bed knife between front and rear rollers having a connection with the trailing link permitting vertical pivotal movement of the cutting unit about a horizontal axis extending cross wise to the direction of travel of the cutting unit, the improvement comprising: the connection of the arm member with the cutting unit being located at a first location on the cutting unit; and a lift element releasably connected between the lift arm and the cutting unit at a second location spaced from said first location so that the lift element maintains the cutting unit in a generally level attitude when lifted by raising the lift arm while the lift element is installed but permits the cutting unit to pivot at said connection to assume a position exposing said reel, bed knife and front and rear rollers when said lift element is released.

27. The reel mower defined in claim 26, wherein said connection includes a first pivot means for establishing a generally horizontal, fore-and-aft extending axis about which said trailing link and cutting unit may pivot.

28. The reel mower defined in claim 26 wherein said trailing link is in the form of a yoke having opposite ends pivotally attached to the cutting unit frame and having a central location between the opposite ends coupled to said lift arm.

29. The reel mower defined in claim 28 wherein said central location of the yoke is defined by a cylindrical tubular receptacle which extends in the direction of travel; and said connection including a coupling pin received in said receptacle whereby the yoke and cutting unit may pivot about said coupling pin.

30. A reel mower including a main frame, an arm means vertically pivotally mounted to the main frame and a trailing link coupled to an end of the lift arm, and a cutting unit having a frame supporting a reel and bed knife between front and rear rollers having a connection with the trailing link permitting vertical pivotal movement of the cutting unit about a horizontal axis extending cross wise to the direction of travel of the cutting unit, the improvement comprising: the connection with the cutting unit being located at a forward location of the cutting unit; and a lift element releasably connected between the lift arm and the cutting unit at a second location spaced rearwardly of said forward location so that the lift element maintains the cutting unit in a generally level attitude when lifted by raising the lift arm while the lift element is installed but permits the cutting unit to pivot at said connection to assume a position exposing said reel, bed knife and front and rear rollers when said lift element is released.

31. The reel mower as defined in claim 30 wherein the lift arm is located such that the cutting unit has a least a portion extending beneath said main frame when the cutting unit is in a lowered working position and such that said arm end is positioned outwardly of said main frame; and said connection defining a substantially upright axis about which the cutting unit may be pivoted to a position disposing the entire cutting unit frame outwardly of the main mower frame, whereby removal of the lifting element and lifting of the cutting unit through means of the arm and link will result in the bottom of the cutting unit being exposed for permitting a technician to check the height of cut and bed knife to reel clearance.

32. A mower mechanism couplable to a vehicle, comprising:
an arm means pivotally coupled with the vehicle,
a reel mower cutting unit having an underside which must be accessed for service, said cutting unit being operatively coupled with the arm means for being propelled with the vehicle, said arm means for being pivotal to raise the reel mower off the ground to a transport position and a service position, and
a releasable member coupled with the cutting unit for maintaining the cutting unit in generally horizontal position when the arm means is raised to the transport position, said member being releasable to allow the cutting unit to swing downwardly with respect to the arm means to expose the underside of the cutting unit for service when said arm means is raised to the service position,
a yoke which couples the cutting unit with the arm means, said cutting unit being generally pivotal with respect to the yoke, and
a releasable locking means which restricts the yoke from pivoting about a vertical axis during mowing operation, said locking means being releasable for allowing the yoke to pivot to expose the underside of the cutting unit laterally outwardly from the vehicle for service.

33. A reel mower including a main frame, an arm means vertically pivotally mounted to the main frame and a trailing link coupled to an end of the arm means, and a cutting unit having a frame supporting a reel and bed knife between front and rear rollers having a connection with the trailing link permitting vertical pivotal movement of the cutting unit about a horizontal axis extending cross wise to the direction of travel of the cutting unit, the improvement comprising: the connection of the arm member with the cutting unit being located at a first location on the cutting unit; and a lift element being releasably connected between the lift arm and the cutting unit at a second location spaced from said first location so that the lift element maintains the cutting unit in a generally level attitude when lifted by raising the lift arm while the lift element is installed but permits the cutting unit to pivot at said connection to assume a position exposing said reel, bed knife and front and rear rollers when said lift element is released,
wherein said connection includes a first pivot means for establishing a generally horizontal, fore-and-aft extending axis about which said trailing link and cutting unit may pivot, and
said connection includes a second pivot means for establishing a generally upright pivot axis about which said trailing link and cutting unit may pivot.

34. A reel mower including a main frame, an arm means vertically pivotally mounted to the main frame and a trailing link coupled to an end of the arm means, and a cutting unit having a frame supporting a reel and bed knife between front and rear rollers having a connection with the trailing link permitting vertical pivotal movement of the cutting unit about a horizontal axis extending cross wise to the direction of travel of the cutting unit, the improvement comprising: the connection of the arm member with the cutting unit being located at a first location on the cutting unit; and a lift element being releasably connected between the lift arm and the cutting unit at a second location spaced from said first location so that the lift element maintains the cutting unit in a generally level attitude when lifted by raising the lift arm while the lift element is installed but permits the cutting unit to pivot at said connection to assume a position exposing said reel, bed knife and front and rear rollers when said lift element is released,
wherein said trailing link is in the form of a yoke having opposite ends pivotally attached to the cutting unit frame and having a central location between the opposite ends coupled to said lift arm,
wherein said central location of the yoke is defined by a cylindrical tubular receptacle which extends in the direction of travel; and said connection including a coupling pin received in said receptacle whereby the yoke and cutting unit may pivot about said coupling pin, and
wherein said end of the arm is defined by a substantially upright tubular receptacle, and said connection including a v-shaped coupling pin having respective limbs received in said receptacles of the yoke and arm.

35. A reel mower including a main frame, an arm means vertically pivotally mounted to the main frame and a trailing link coupled to an end of the arm means, and a cutting unit having a frame supporting a reel and bed knife between front and rear rollers having a connection with the trailing link permitting vertical pivotal movement of the cutting unit about a horizontal axis extending cross wise to the direction of travel of the cutting unit, the improvement comprising: the connection of the arm member with the cutting unit being located at a first location on the cutting unit; and a lift element being releasably connected between the lift arm and the cutting unit at a second location spaced from said first location so that the lift element maintains the cutting unit in a generally level attitude when lifted by raising the lift arm while the lift element is installed but permits the cutting unit to pivot at said connection to assume a position exposing said reel, bed knife and front and rear rollers when said lift element is released, wherein said trailing link is in the form of a yoke having opposite ends pivotally attached to the cutting unit frame and having a central location between the opposite ends coupled to said lift arm, wherein said central location of the yoke is defined by a cylindrical tubular receptacle which extends in the direction of travel; and said connection including a coupling pin received in said receptacle whereby the yoke and cutting unit may pivot about said coupling pin, wherein said end of the arm is defined by a substantially upright tubular receptacle, and said connection including a v-shaped coupling pin having respective limbs received in said receptacles of the yoke and arm, and wherein said connection further includes a v-shaped strap having respective limbs received on the respective limbs of the v-shaped coupling pin such that one strap limb is located ahead of the yoke receptacle while the other strap limb is located below the arm receptacle; said other strap limb being provided with a turn limiting notch; and a stop pin being releasably mounted to the arm receptacle with a lower end portion of the stop pin being located within the notch, whereby engagement of the stop pin with said other strap limb will limit the relative pivotal movement of the cutting unit to the arm as determined by the shape of the notch.

* * * * *